(12) United States Patent
Raven et al.

(10) Patent No.: US 9,624,778 B2
(45) Date of Patent: Apr. 18, 2017

(54) ROTOR BLADE MANUFACTURE

(71) Applicant: ROLLS-ROYCE PLC, London (GB)

(72) Inventors: Gemma Alexandra Raven, Royston (GB); Christopher Jonathan Taylor, Derby (GB); Alexander David May, Ripley (GB); Andrew Alan Robert Baird, Derby (GB)

(73) Assignee: ROLLS-ROYCE plc, London (GB)

( * ) Notice: Subject to any disclaimer, the term of this patent is extended or adjusted under 35 U.S.C. 154(b) by 200 days.

(21) Appl. No.: 14/725,898

(22) Filed: May 29, 2015

(65) Prior Publication Data

US 2015/0369051 A1 Dec. 24, 2015

(30) Foreign Application Priority Data

Jun. 24, 2014 (GB) .................................. 1411181.9

(51) Int. Cl.
*F01D 5/14* (2006.01)
*B24B 19/14* (2006.01)
(Continued)

(52) U.S. Cl.
CPC .............. *F01D 5/141* (2013.01); *B23P 6/002* (2013.01); *B24B 19/14* (2013.01); *F01D 5/027* (2013.01); *F01D 5/20* (2013.01); *F01D 5/3038* (2013.01); *F01D 25/285* (2013.01); *F04D 29/322* (2013.01); *F04D 29/644* (2013.01); *F05D 2220/32* (2013.01); *F05D 2230/10* (2013.01); *F05D 2230/18* (2013.01); *F05D 2230/60* (2013.01); *F05D 2230/64* (2013.01); *F05D 2240/30* (2013.01); *F05D 2240/307* (2013.01); *Y10T 29/49323* (2015.01)

(58) Field of Classification Search
CPC ........ B23P 6/002; B24B 19/14; F01D 25/285; F01D 5/027; F01D 5/20; F04D 29/322
See application file for complete search history.

(56) References Cited

U.S. PATENT DOCUMENTS

| | | | | |
|---|---|---|---|---|
| 5,242,270 A | * | 9/1993 | Partington | ................ F01D 5/22 416/193 A |
| 5,822,841 A | * | 10/1998 | Bales | .................... B23P 15/006 269/287 |

(Continued)

FOREIGN PATENT DOCUMENTS

GB 2 487 799 A 8/2012

OTHER PUBLICATIONS

Oct. 15, 2015 Search Report issued in European Patent Application No. 15 16 9812.

(Continued)

*Primary Examiner* — Jacob Cigna
(74) *Attorney, Agent, or Firm* — Oliff PLC (57) ABSTRACT

A method is provided of processing one or more blades of a row of blades which forms part of a rotor for a gas turbine engine. The method includes: providing a rotor disc having a slot for mounting one or more blades; loading the blades in the slot and loading the wax blocks in or adjacent the slot, the wax blocks being configured and positioned such that, on loading, the blades shear material from the wax blocks, the sheared wax blocks reducing a range of tilt angles which can be adopted by the blades; and performing a processing operation on the loaded blades.

10 Claims, 5 Drawing Sheets

(51) Int. Cl.
*B23P 6/00* (2006.01)
*F01D 5/02* (2006.01)
*F01D 5/30* (2006.01)
*F01D 5/20* (2006.01)
*F01D 25/28* (2006.01)
*F04D 29/32* (2006.01)
*F04D 29/64* (2006.01)

(56) References Cited

U.S. PATENT DOCUMENTS

| | | | |
|---|---|---|---|
| 7,121,785 B2 * | 10/2006 | Carlson, Jr. | F01D 11/005 |
| | | | 277/917 |
| 9,114,496 B2 * | 8/2015 | Saunders | B24B 1/00 |
| 9,145,781 B2 * | 9/2015 | Plante | F01D 9/041 |
| 2006/0002787 A1 * | 1/2006 | Carlson, Jr. | F01D 11/005 |
| | | | 415/9 |
| 2012/0202405 A1 * | 8/2012 | Saunders | B24B 19/14 |
| | | | 451/54 |
| 2014/0255167 A1 * | 9/2014 | Stevens | F01D 11/12 |
| | | | 415/173.3 |
| 2015/0369051 A1 * | 12/2015 | Raven | F01D 5/3038 |
| | | | 29/889.21 |

OTHER PUBLICATIONS

Jan. 21, 2015 Search Report issued in British Application No. GB1411181.9.

* cited by examiner

ROTOR BLADE MANUFACTURE

CROSS-REFERENCE TO RELATED APPLICATIONS

This application is based upon and claims the benefit of priority from British Patent Application Number 1411181.9 filed 24 Jun. 2014, the entire contents of which are incorporated by reference.

BACKGROUND

1. Field of the Disclosure

The present disclosure relates to a method of manufacturing the blades of a rotor for a gas turbine engine. In particular, but not exclusively, this disclosure can relate to a method of grinding the tips of the blades.

2. Description of the Related Art

Figure 1:
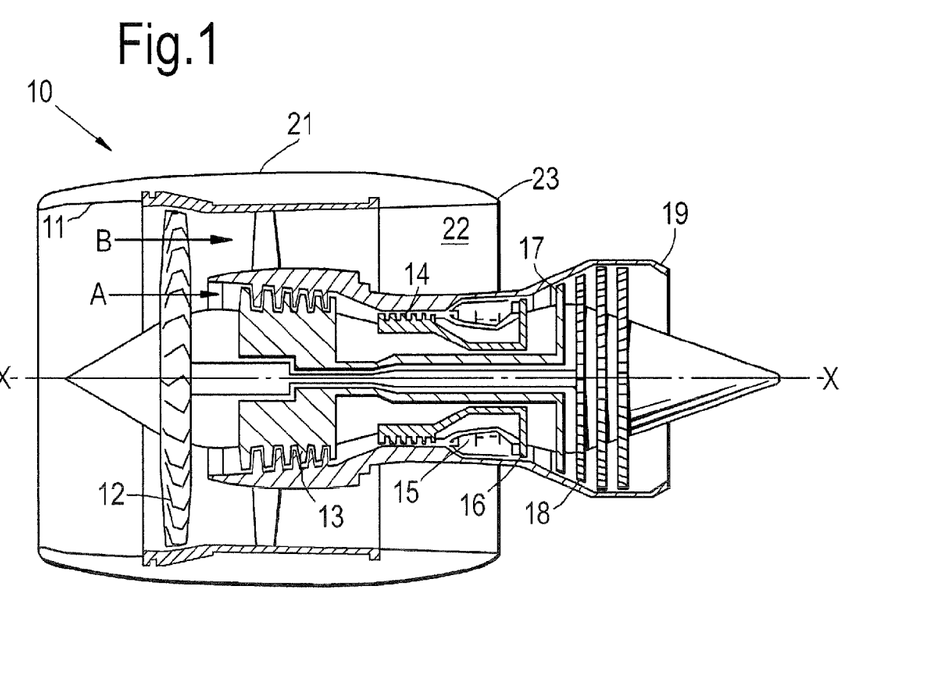
FIG. 1 shows a longitudinal cross-section through a ducted fan gas turbine engine.

With reference to FIG. 1, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

It is well known that to maintain an efficient gas turbine engine the gap between compressor blade tips and the engine casing is closely controlled to minimise the leakage of compressed air over the blade tips and back upstream. To this end, the engine casing often includes an abradable liner which provides a close fitting seal with the blade tips.

The abradable liner is initially installed so as to be in contact with the compressor blade tips. During the first few rotations of the compressor rotors, the abradable liner is scored by the rotating fan and compressor blade tips which remove just enough material to allow a free rotation of the compressor blades whilst maintaining a close gap. The abradable nature of the liner allows it to be sculpted by the blade tips to provide a tailored and close fit.

During engine use, the radial positions of the rotating blade tips move due to thermal expansion and vibration. This movement further rubs the abradable liner such that the mean operating gap between the blade tips and liner increases over time. This increases the leakage of air back up the compressor, thereby reducing efficiency and performance of the engine.

Figure 2:
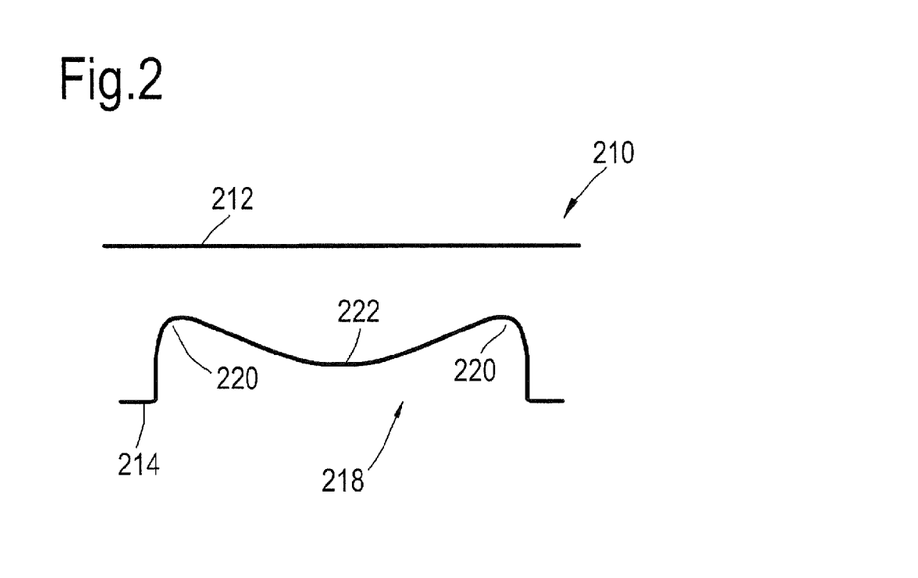
FIG. 2 shows a typical abradable liner tip rub profile.

FIG. 2 shows a typical but exaggerated profile of an abradable liner 210 caused by compressor blade tip rub over time. The liner includes an outer surface 212 which is attached to the engine casing and an inner surface 214 which faces the rotor. In use, the blade rotates about the rotor axis, travelling in a direction perpendicular to the page, so as to contact and rub the liner. The profile of the rub 218 can be generally described as "M" shaped where the extent of the rub is greater towards the edges 220 of the rotational path of the blades than in the mid portion 222. Although the exact profile of the rub will change between rotors and engines, the "M" shaped profile is a reasonably common occurrence.

During manufacture of the rotors, the blades undergo a grinding process in which a blade assembly is rotated such that the tips of the blades pass a rotating grinding wheel which removes a portion of the blade. Typically, approximately one to two millimetres is removed from each blade tip with the grinding controlled such that the peak to peak height difference between leading and trailing edges of blade tip is typically less than 0.1 mm. In this way, the positions of the each of the blade tips can be controlled during rotation such that the erosion of the abradable liner is reduced. The blades can also undergo other processing operations during manufacture, such as measurement validation of rotor concentricity.

There are two main types of compressor blade root construction:

Circumferential, where the roots of the blade are loaded one after another into the rotor via a circumferential slot and moved round circumferentially until the stage is full, and Axial, where the roots of the blades are loaded into individual axially directed slots which are generally at an angle to the engine centreline.

Figure 3:
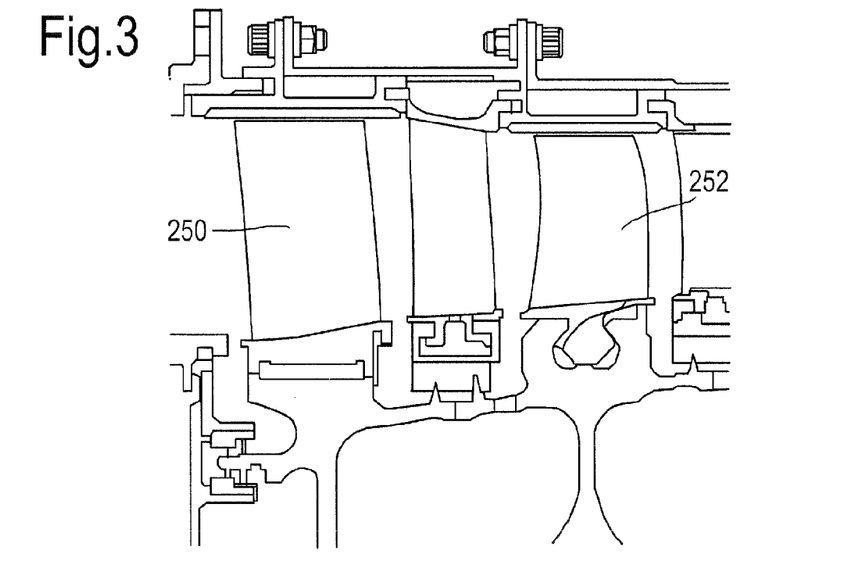
FIG. 3 shows an axial root blade on the left and circumferential root blade on the right.

FIG. 3 shows an axial root blade 250 on the left and circumferential root blade 252 on the right.

Figure 4:
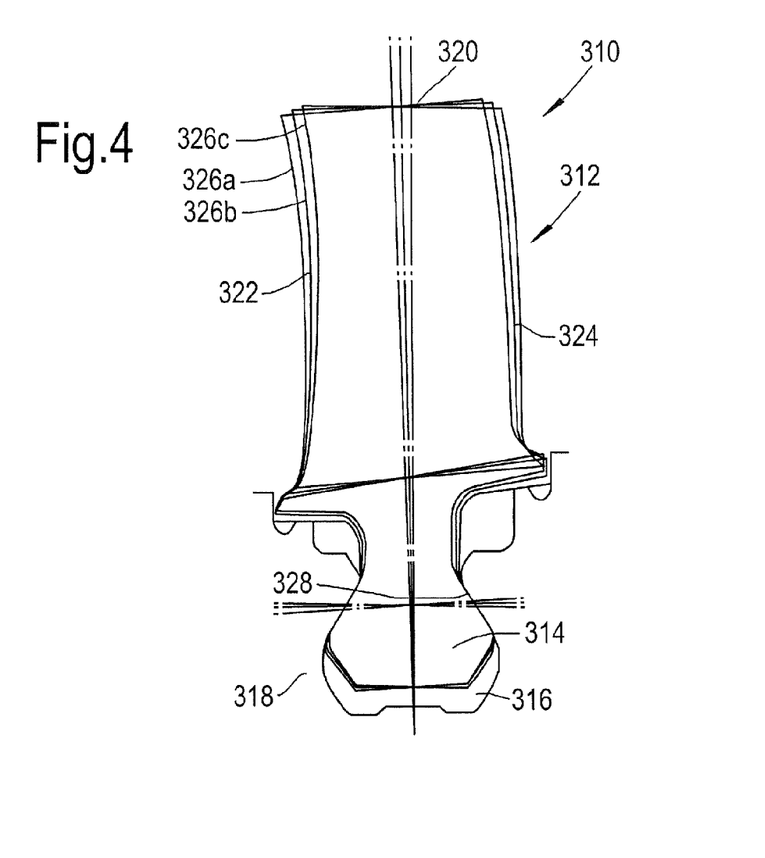
FIG. 4 shows schematically three tilt positions in which a blade can rest relative to a disc.

In FIG. 4 there is shown a cross section of an intermediate compressor rotor 310 having a blade 312 with a circumferential root 314 which is snugly received within a slot 316 in a disc 318. The blade includes a tip 320, a leading edge 322 and a trailing edge 324.

There is a degree of movement provided between the blade root 314 and disc slot 316 in order for the blades to be slotted into place. This allows the blade 312 to rest in different positions within the rotor as shown by the positions indicated by reference numeral 326a, the second by 326b and the third by 326c. The second position 326b represents the mid-point of the blade 312 within the slot 316 with the other two positions demonstrating the range of movement.

During use, the rotor is rotated at several thousand rpm which results in a radial centrifugal force acting on the blade 312. This results in a stiction between the shoulder of the root 328 and corresponding opposing surface of the slot 316, which keeps the blade 312 in a fixed position. It has been previously known that blades can move when the rotor 310 slows to a halt and the centrifugal force that locks the blades in place no longer applies. Thus, when in service, the blade 312 may fall into one or other of the extreme positions where they will remain until the engine is next started.

The above sequence of events leads to the movement of the blade and the different tilt positions leads to the tips of the blades being higher or lower in relation to the abradable liner. This results in the "M" shaped profiled in the liner. However, the extent of the "M" profile is greater than could be explained by the movement of the blades in this way.

In particular, it is known that the blades held within a blade assembly for grinding can move prior to the grinding operation, particularly when the grinding process is stopped part way through and restarted as is sometimes necessary if a blade is damaged and needs replacing. If one or more of the blades does move during this process, for example, from position 326a to position 326c as shown in FIG. 4, then the profile created by the grinding process is effectively skewed.

Figures 5A, 5B:
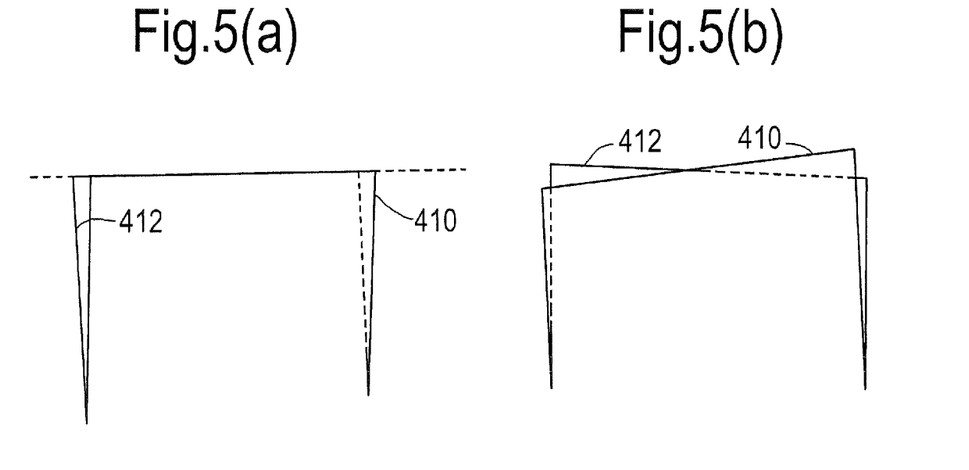

If the position of a blade alters during the grinding process then they will have different profiles with respect to one another. FIG. 5(a) shows a pair of blades 410, 412 which have moved during the grinding process and are no longer aligned. Although the grinding of the blade tips is well controlled such that the tip variance between blades is less than 100 microns, the different positions of the blades 410, 412 are not accounted for. Hence, as shown in FIG. 5(b), if the blades 410, 412 move relative to the disc during service of the engine e.g. when the rotor comes to rest after a period of use, the blades 410, 412 can swap tilt positions and the error which would ordinarily be expected is doubled. The actual difference this leads to can be in the order of hundreds of microns.

Although discussed above in relation to circumferential root blades, similar problems of blade movement and different forward/rearward tilt positions can apply to axial root blades because of the angling of their roots relative to the engine centreline.

Figure 6:
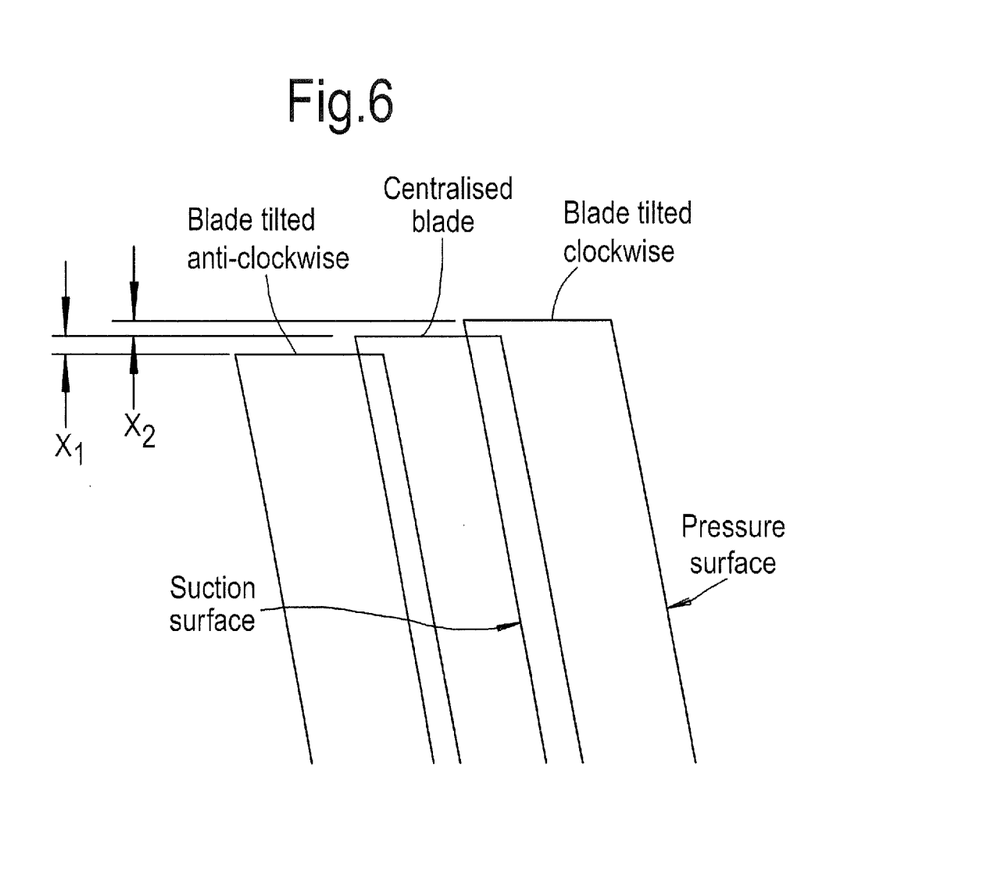
FIG. 6 shows schematically a rearwards directed view of blade tip of a blade with an axial root for different levels of tilt.

For example, FIG. 6 shows schematically a rearwards directed view of blade tip of a blade with an axial root for different levels of tilt. If the blade is tilted fully anti-clockwise (as shown by the blade to the left in FIG. 6) in the root when it is ground the blade is X1 longer than a blade that was centralised (shown by the central blade in FIG. 6) during grind. If this blade then rotates fully clockwise (as shown by the blade to the right in FIG. 6) during a subsequent run in the engine, the blade tip is (X1+X2) radially further outward that the nominal desired tip position. This may be a significant amount and results in the blade tip rubbing out the abradable liner by an additional (X1+X2) depth. This increases running clearances by (X1+X2) for a blade with a nominal blade tip position. For a blade that was tilted clockwise during grinding but then tilts anticlockwise during running, the blade tip will be (X1+X2) radially more inward than a nominal tip. This means if this blade is running within a casing that has suffered the (X1+X2) additional rub an equivalent additional tip clearance will exist. Accordingly, the effect on running clearances and hence compressor efficiency and surge margin may be significant.

Another unfortunate aspect of blade tilt associated with axial roots, is the effect it has on the angle of the tip of the longest blade. In the example described above and shown in FIG. 6, the drum rotational direction is clockwise i.e. from left to right in the diagram. The longest blade rotates clockwise by $\phi°$ relative to the position it was in when it was ground. This results in the blade tip having a negative relief (or clearance) angle with the casing of $\phi°$, with the suction surface edge touching the casing rather than the pressure surface edge. This negative relief angle makes the blade tip an inefficient cutting tool, such that for high incursions significant heat and blade vibration is created. This can result in over-cutting of the soft abradable liner due to heat build-up, softening of the liner material, and its deposit on the longest blade doing the rubbing. It can also result in aerofoil cracking due to vibration.

Excess blade tilt can also be a problem in other processing operations, such as when measuring blade stage concentricity, because variation in the blade tip positions around the circumference can cause false readings and bias in blade location analysis.

US 2012/202405 proposes a method of grinding blade tips which aligns the blades in a predetermined position using compressed air before the grinding operation.

OBJECTS AND SUMMARY

It would be desirable to provide an improved method aligning blades during grinding and other processing operations.

Accordingly, the present disclosure provides a method of processing one or more blades of a row of blades which forms part of a rotor for a gas turbine engine, the method including:

providing a rotor disc having a slot for mounting one or more blades;

loading the blades in the slot and loading pre-formed wax blocks in or adjacent the slot, the wax blocks being configured and positioned such that, on loading, the blades shear material from the wax blocks, the sheared wax blocks reducing a range of tilt angles which can be adopted by the blades; and performing a processing operation on the loaded blades.

Typically, the pre-formed wax blocks are slightly oversized. The loading of the blades then shear surfaces off the blocks, reducing them to an appropriate size to counteract tolerances in the blade and slot geometries which would otherwise allow the blades to tilt excessively. The reduced range of tilt angles available to the blades during the processing operation eliminates extreme blade positions. For example, in relation to blade tip grinding, this results in a narrower distribution of post-ground blade lengths. In use, this leads to a corresponding reduction in the over-cutting of the profile formed in the abradable liner, which in turn decreases tip clearances and increases efficiencies. However, advantageously, the wax blocks may not eliminate blade wobble entirely, as it is useful for avoiding excessive vibration or "ringing" of individual blades during processing, e.g. when forced by a grinding wheel. Such vibration can be damaging to both the blades and the disc.

Optional features will now be set out. These are applicable singly or in any combination.

The blades are generally compressor blades. However, they can be turbine blades, such as shroudless turbine blades.

The processing operation may be grinding the blade tips or measuring rotor concentricity.

By appropriate choice of wax block configuration, the blocks may reduce the range of tilt angles by at least 50%, and preferably by at least 60% or 70%. However, preferably the blocks reduce the range of tilt angles by at most 90% or 80%, some residual clearance facilitating assembly of the blades into the rotor and avoiding excessive vibration during processing.

The slot may be a circumferential slot for mounting a plurality of blades. Alternatively, the disc may have a plurality of axial slots for mounting respective blades, the blades being loaded in the slots and the wax blocks being loaded in or adjacent the slots. Either way, the slots may be configured to accept dovetail or fir tree blade roots.

The blades may have laterally-projecting platforms which extend over a rim of the disc or laterally-extending seal wings. Respective wax blocks can then be positioned beneath the platforms or seal wings. In such an arrangement, the blocks can be located in the slot, or adjacent the slot e.g.

on a rim of the disc in which the slot is formed. Another option is for respective wax blocks to be positioned in the slot beneath the roots of the blades. The blocks are thus able to apply an upwards force on under surfaces of the blades to account for slot and blade tolerances.

Conveniently the wax can be a standard fixturing wax used in manufacturing, such as a polyethylene glycol based wax. Advantageously, such waxes can be easily formable into shape (e.g. through casting or injection moulding), and have sufficient stiffness and strength to load the blades. They can also be removable by dissolution in a washing process.

Alignment and positioning of the blocks in the slot may be assisted by formations in the blocks which allow the blocks to be manipulated by suitable tooling.

The method may further include balancing the blades before the blades are processed.

The method may further include applying a protective coating to the loaded blades to protect the blades from debris generated during the processing operation. The blades can then be washed after the processing operation to remove the protective coating. Such washing can also help to remove the wax blocks.

Indeed, more generally, the method may further include removing the wax blocks from the disc after the processing operation, for example by dissolving the blocks in a wash process, or burning off the blocks.

BRIEF DESCRIPTION OF THE DRAWINGS

Embodiments will now be described by way of example with reference to the accompanying drawings in which:

FIG. 5 shows schematically (a) a ground profile of two blades resting in two positions during the grinding process, and (b) the ground blades with resting positions swapped during a period of use;

FIG. 7 shows schematically (a) a side view of a root of a blade loaded in an axial slot of a disc, (b) a bottom view of the root of the blade loaded in the axial slot, and (c) a side view of a blade loaded in a circumferential slot of a disc; and FIG. 8 shows schematically (a) a bottom view of the roots of two neighbouring blades loaded in respective axial slots formed in a rim of a disc, and (b) a side view of a blade loaded in a circumferential slot of a disc.

DETAILED DESCRIPTION OF EMBODIMENTS

The method of the present disclosure can reduce the range of available blade tilt angles during the tip grinding process, allowing all the blades to be accurately and consistently located so that a more concentric rotor can be ground. It also has utility in other processing operations such as measurement validation of rotor concentricity.

This can be achieved by loading the blades and wax blocks in the circumferential slot or axial slots of a rotor disc, balancing the blades, coating with a protective paint, and grinding the tips of the blades. During the subsequent standard wash process to remove the paint, the wax blocks are also washed out. The wax blocks operate by providing a force on the underside of the blades, for example, pressing on seal wing, root, or platform under surfaces.

The wax blocks can provide a suitably hard surface on which to locate the blades. Advantageously, the surface of the wax blocks is sheared when assembled between the blades and the disc. To account for manufacturing variation in the blades and the disc, the wax blocks can be configured so as to be large enough to fit the largest possible clearance between a given blade and the disc. When the clearance is smaller, the blocks are then sheared so that they accurately self-size to fit the exact geometry. A chamfered edge can be provided on the wax blocks and sized to the tolerance band of possible blade and disc fits, allowing easy placement and self-sizing of the wax piece during assembly.

Figure 7A:
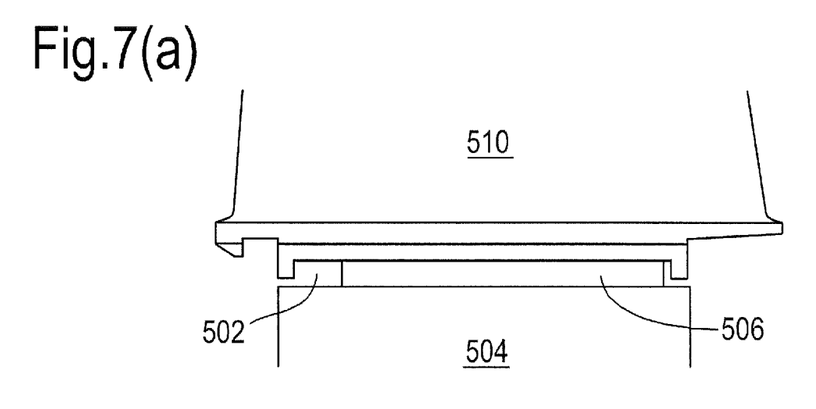
Figure 7B:
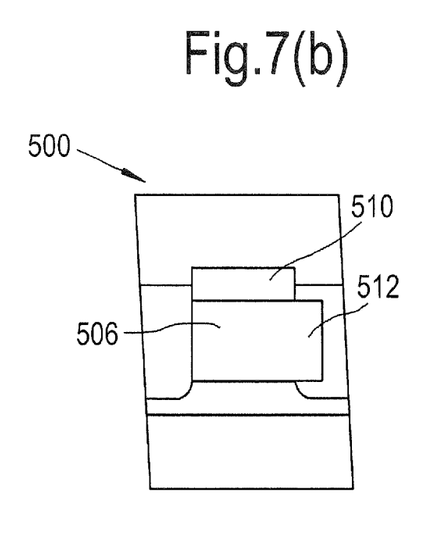
Figure 7C:
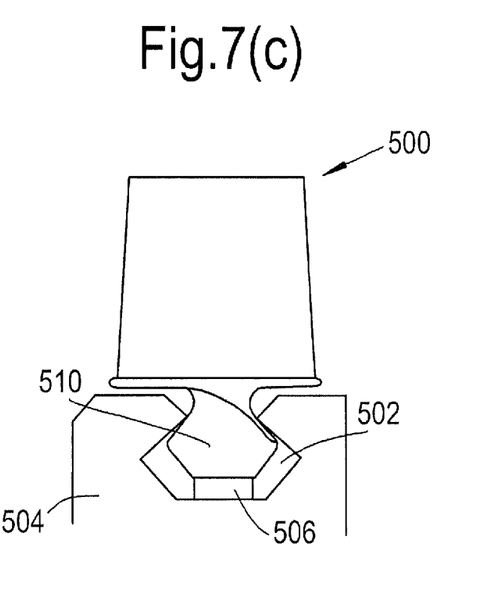

FIG. 7 shows schematically (a) a side view of a root 510 of a blade loaded in an axial slot 502 of a disc 504 (b) a bottom view of the root 510 of the blade 500 loaded in the axial slot, and (c) a side view of a blade 500 loaded in a circumferential slot 502 of a disc 504. In both cases, a wax block 506 is positioned between the underside of the root and the bottom of the slot, the top face of the block being sheared off on insertion by the hard edge of the blade root, sizing the block to the exact clearance geometry. The block may also have a tab 512 which protrudes sideways from under the root, allowing a tool to be inserted to aid fitting of the block under the root. One such wax block is inserted under each blade root.

Figure 8A:
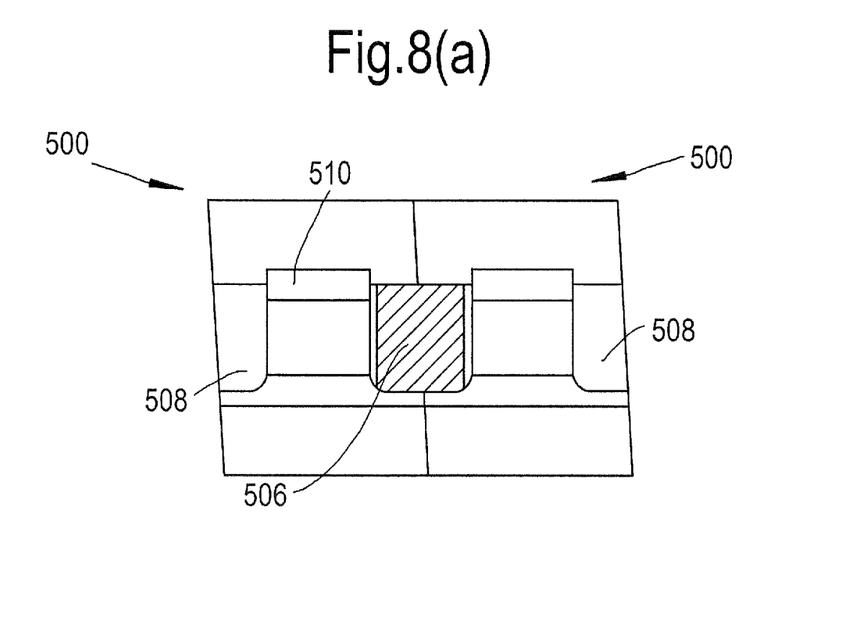
Figure 8B:
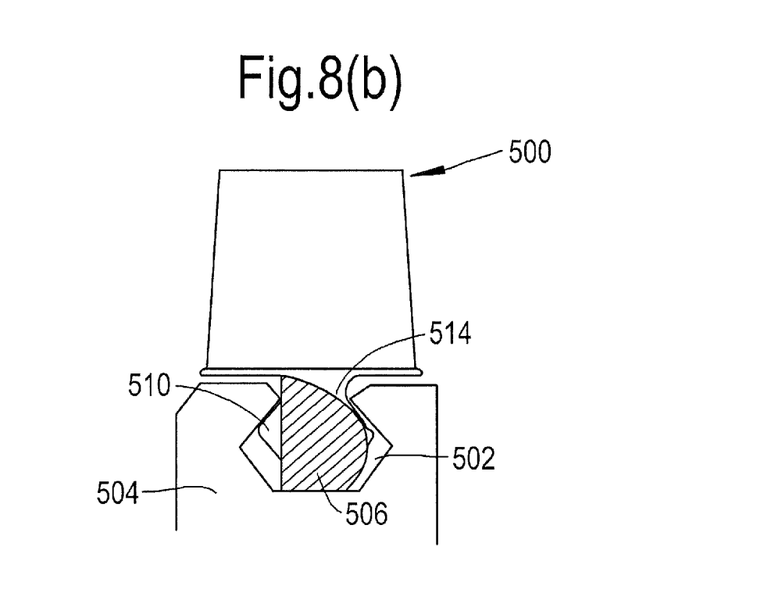

FIG. 8 shows schematically (a) a bottom view of the roots 510 of two neighbouring blades 500 loaded in respective axial slots formed in a rim of a disc (not shown), and (b) a side view of a blade 500 loaded in a circumferential slot 502 of a disc 504. In FIG. 8(a), the wax block 506 is positioned between the rim of the disc and the undersides of neighbouring platforms 508 which project laterally from either side of each blade to extend over the rim. The block sits on the rim of the disc, and has a flat upper face which locates against its platforms. The block is shearable by the hard edges of the platforms on insertion to form a tight fit. In FIG. 8(b), the wax block 506 is positioned between the bottom of the slot 502 and the undersides of neighbouring seal wings 514 which project laterally from either side of the root of each blade. The block locates horizontally and vertically using locating faces on the side and bottom of the slot, and has a quarter-circular face which locates against its seal wings. The block is shearable by the hard edge of the seal wings on insertion to form a tight fit.

By providing a narrower distribution of ground blade lengths, the method can reduce casing rub and tip leakage, resulting in specific fuel consumption improvements which may be of the order of 0.1-0.2%. In addition, the method reduces instances of rubbing-induced blade cracking.

While the disclosure has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

We claim:

1. A method of processing one or more blades of a row of blades which forms part of a rotor for a gas turbine engine, the method including:

providing a rotor disc having a slot for mounting one or more blades;

loading the blades in the slot and loading pre-formed wax blocks in or adjacent to the slot, the wax blocks being configured and positioned such that, on loading, the blades shear material from the wax blocks, the sheared wax blocks reducing a range of tilt angles which can be adopted by the blades; and performing a processing operation on the loaded blades.

2. A method according to claim 1, wherein the processing operation is grinding the blade tips.

3. A method according to claim 1, wherein the wax blocks reduce the range of tilt angles by at least 50%.

4. A method according to claim 1, wherein the slot is a circumferential slot for mounting a plurality of blades.

5. A method according to claim 1, wherein the disc has a plurality of axial slots for mounting respective blades, the blades being loaded in the slots and the wax blocks being loaded in or adjacent the slots.

6. A method according to claim 1, wherein the blades have laterally-projecting platforms which extend over a rim of the disc or laterally-projecting seal wings, and respective wax blocks are positioned beneath the platforms or seal wings.

7. A method according to claim 1, wherein respective wax blocks are positioned in the slot beneath the roots of the blades.

8. A method according to claim 1 which further includes balancing the blades before the blades are processed.

9. A method according to claim 1, which further includes applying a protective coating to the loaded blades to protect the blades from debris generated during the processing operation.

10. A method according to claim 1, which further includes removing the wax blocks from the rotor.

* * * * *